United States Patent
Sakhnini et al.

(10) Patent No.: US 11,626,936 B2
(45) Date of Patent: Apr. 11, 2023

(54) GRID ALLOCATIONS FOR SINGLE CARRIER WAVEFORMS

(71) Applicant: QUALCOMM Incorporated, San Diego, CA (US)

(72) Inventors: Iyab Issam Sakhnini, San Diego, CA (US); Tao Luo, San Diego, CA (US); Jun Ma, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/193,565

(22) Filed: Mar. 5, 2021

(65) Prior Publication Data

US 2022/0286219 A1    Sep. 8, 2022

(51) Int. Cl.
*H04W 72/04* (2009.01)
*H04J 1/02* (2006.01)
*H04W 72/044* (2023.01)

(52) U.S. Cl.
CPC ........... *H04J 1/02* (2013.01); *H04W 72/0406* (2013.01); *H04W 72/044* (2013.01)

(58) Field of Classification Search
CPC .............................. H04W 72/0406; H04J 1/02
See application file for complete search history.

(56) References Cited

U.S. PATENT DOCUMENTS

| | | | |
|---|---|---|---|
| 11,265,875 B2* | 3/2022 | Khoshnevisan | H04L 5/0007 |
| 2018/0097594 A1* | 4/2018 | Wang | H04W 72/0413 |
| 2019/0327691 A1* | 10/2019 | Zhang | H04W 52/247 |
| 2020/0374852 A1* | 11/2020 | Khoshnevisan | H04L 27/2605 |
| 2021/0067194 A1* | 3/2021 | Takeda | H04W 72/0446 |

* cited by examiner

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a first node may determine a grid allocation of single carrier resource blocks (SC-RBs) that defines a plurality of SC-RBs in a time domain and in a frequency domain. The first node may perform, to a second node, a frequency division multiplexed transmission associated with a single carrier waveform using one or more SC-RBs indicated in the grid allocation of SC-RBs. Numerous other aspects are described.

30 Claims, 10 Drawing Sheets

GRID ALLOCATIONS FOR SINGLE CARRIER WAVEFORMS

FIELD OF THE DISCLOSURE

Aspects of the present disclosure generally relate to wireless communication and to techniques and apparatuses for grid allocations for single carrier waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TD MA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first node includes determining a grid allocation of single carrier resource blocks (SC-RBs) that defines a plurality of SC-RBs in a time domain and in a frequency domain; and performing, to a second node, a frequency division multiplexed transmission associated with a single carrier waveform using one or more SC-RBs indicated in the grid allocation of SC-RBs.

In some aspects, a method of wireless communication performed by a first node includes determining a grid allocation of SC-RBs that defines a plurality of SC-RBs in a time domain and in a frequency domain; and receiving, from a second node, a frequency division multiplexed transmission associated with a single carrier waveform using one or more SC-RBs indicated in the grid allocation of SC-RBs.

In some aspects, a first node for wireless communication includes a memory; and one or more processors, operatively coupled to the memory, configured to: determine a grid allocation of SC-RBs that defines a plurality of SC-RBs in a time domain and in a frequency domain; and perform, to a second node, a frequency division multiplexed transmission associated with a single carrier waveform using one or more SC-RBs indicated in the grid allocation of SC-RBs.

In some aspects, a first node for wireless communication includes a memory; and one or more processors, operatively coupled to the memory, configured to: determine a grid allocation of SC-RBs that defines a plurality of SC-RBs in a time domain and in a frequency domain; and receive, from a second node, a frequency division multiplexed transmission associated with a single carrier waveform using one or more SC-RBs indicated in the grid allocation of SC-RBs.

In some aspects, a non-transitory computer-readable medium storing a set of instructions for wireless communication includes one or more instructions that, when executed by one or more processors of a first node, cause the first node to: determine a grid allocation of SC-RBs that defines a plurality of SC-RBs in a time domain and in a frequency domain; and perform, to a second node, a frequency division multiplexed transmission associated with a single carrier waveform using one or more SC-RBs indicated in the grid allocation of SC-RBs.

In some aspects, a non-transitory computer-readable medium storing a set of instructions for wireless communication includes one or more instructions that, when executed by one or more processors of a first node, cause the first node to: determine a grid allocation of SC-RBs that defines a plurality of SC-RBs in a time domain and in a frequency domain; and receive, from a second node, a frequency division multiplexed transmission associated with a single carrier waveform using one or more SC-RBs indicated in the grid allocation of SC-RBs.

In some aspects, a first apparatus for wireless communication includes means for determining a grid allocation of SC-RBs that defines a plurality of SC-RBs in a time domain and in a frequency domain; and means for performing, to a second apparatus, a frequency division multiplexed transmission associated with a single carrier waveform using one or more SC-RBs indicated in the grid allocation of SC-RBs.

In some aspects, a first apparatus for wireless communication includes means for determining a grid allocation of SC-RBs that defines a plurality of SC-RBs in a time domain and in a frequency domain; and means for receiving, from a second apparatus, a frequency division multiplexed transmission associated with a single carrier waveform using one or more SC-RBs indicated in the grid allocation of SC-RBs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
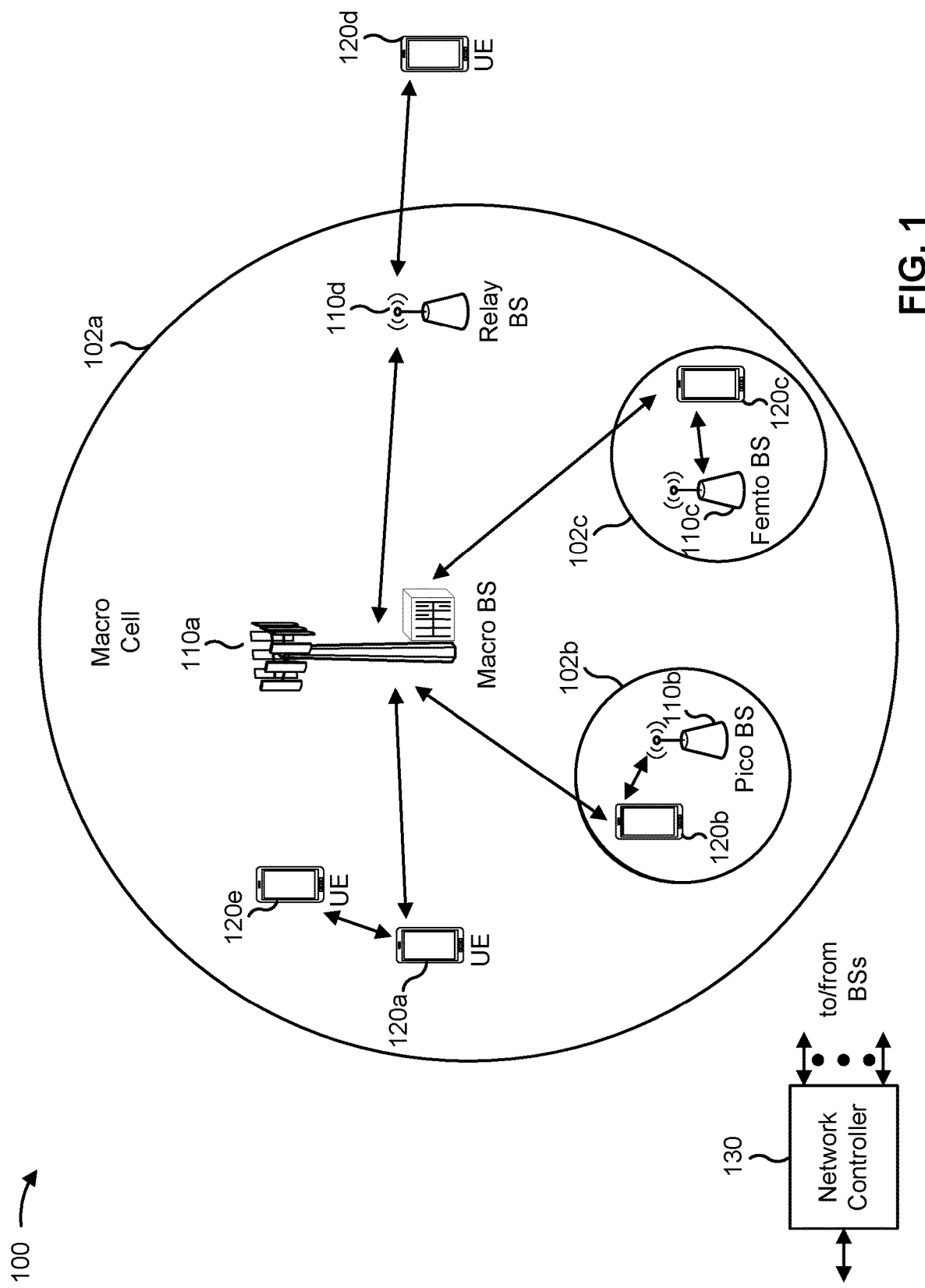
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
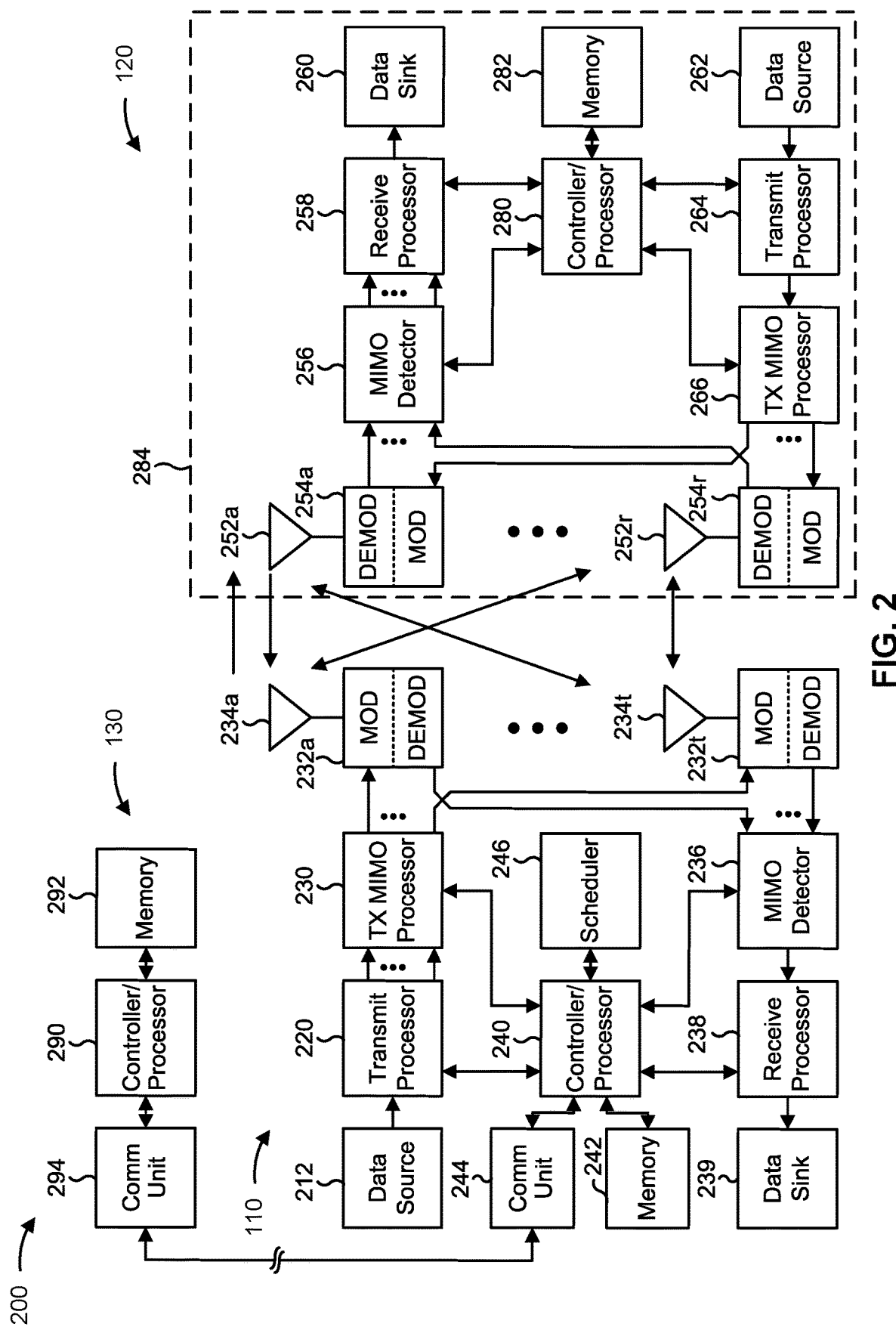
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with grid allocations for single carrier waveforms, as described in more detail elsewhere herein. In some aspects, the node described herein is the base station 110, is included in the base station 110, or includes one or more components of the base station 110 shown in FIG. 2. In some aspects, the node described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a first node includes means for determining a grid allocation of SC-RBs that defines a plurality of SC-RBs in a time domain and in a frequency domain; and/or means for performing, to a second node, a frequency division multiplexed transmission associated with a single carrier waveform using one or more SC-RBs indicated in the grid allocation of SC-RBs.

In some aspects, the means for the first node (e.g., base station 110) to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the means for the first node (e.g., UE 120) to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first node includes means for determining a grid allocation of SC-RBs that defines a plurality of SC-RBs in a time domain and in a frequency domain; and/or means for receiving, from a second node, a frequency division multiplexed transmission associated with a single carrier waveform using one or more SC-RBs indicated in the grid allocation of SC-RBs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In higher NR operating bands, larger bandwidths may be desirable. Several waveforms may be used for downlink operations in the larger bandwidths of the higher NR operating bands. For example, waveforms associated with a single carrier frequency domain implementation (e.g., DFT-s-OFDM waveforms) may provide a relatively low peak-to-average power ratio (PAPR) and better coverage, single tap frequency domain equalization (FDE), and/or efficient bandwidth utilization without use of a guard band. Some single carrier waveforms, such as DFT-s-OFDM waveforms, may be associated with the single carrier frequency domain implementation.

As another example, waveforms associated with a single carrier time domain implementation (e.g., single carrier quadrature amplitude modulation (SC-QAM) waveforms) may provide a relatively low PAPR and better coverage, and/or a relatively low complexity due to no Fast Fourier Transform (FFT) or Inverse Fast Fourier Transform (IFFT). Further, a CP may be added to allow for FDE implementation. Some single carrier waveforms, such as SC-QAM waveforms, may be associated with the single carrier time domain implementation.

As yet another example, OFDM waveforms may provide a relatively high PAPR, a relatively high signal-to-noise ratio (SNR), relatively high spectral efficiency, high order MIMO that enables relatively high data rates, single tap FDE, efficient bandwidth utilization without use of a guard band, and/or relatively straightforward frequency division multiplexing (FDM) capability.

For OFDM waveforms, FDM may be supported by mapping symbols into desired single carriers. However, for single carrier waveforms, such as SC-QAM and SC-FDE, FDM is more complex and may involve additional considerations. For single carrier waveforms, a UE may have a wide radio frequency bandwidth, and baseband components may filter smaller bandwidth channels/allocations. Alternatively, for single carrier waveforms, a UE may adapt a radio frequency bandwidth with a channel bandwidth, which may reduce complexity and power consumption at the UE. When the channel bandwidth changes, baseband components of the UE may modify the radio frequency bandwidth and may incur a delay, so gaps may be implemented. Further, a guard band may be inserted between different frequency division multiplexed single carrier signals, which may account for a pulse shaping filter at a Tx UE.

An FDM capability is desirable for single carrier waveforms. Different channels, allocations, and/or signals may have different bandwidth requirements depending on a needed power/energy and coverage, an available bandwidth and a configuration to frequency division multiplex other signals, UE power savings, and/or other factors. For example, a physical random access channel (PRACH) may have a different bandwidth requirement than a physical uplink shared channel (PUSCH) allocation. As another example, a physical downlink shared channel (PDSCH) for a certain allocation may require a different bandwidth as compared to another PDSCH allocation. A presence of the FDM capability may be important for carrier utilization and efficiency. Further, some delay intolerant applications may require immediate grants and allocations, and relying only on a time division multiplexing (TDM) capability and not FDM may lead to delays for such UEs. Existing FDM solutions for other waveform types may be insufficient and/or not applicable to single carrier waveforms.

In various aspects of techniques and apparatuses described herein, a first node may perform, to a second node, a frequency division multiplexed transmission associated with a single carrier waveform using one or more SC-RBs indicated in a grid allocation of SC-RBs. The first node may be a base station or a UE, and the second node may be a base station or a UE. The grid allocation of SC-RBs may define a plurality of SC-RBs in a time domain and in a frequency domain. The frequency division multiplexed transmission may be an uplink transmission, a downlink transmission, or a sidelink transmission. The grid allocation of SC-RBs may be associated with one or more sub-bands in the frequency domain and one or more time periods in the time domain. The grid allocation of SC-RBs may be associated with a carrier or a channel that includes one or more sub-bands. The grid allocation of SC-RBs may enable FDM for single carrier waveforms and may reduce an implementation complexity and scheduling complexity at the first node and the second node.

Figure 3:
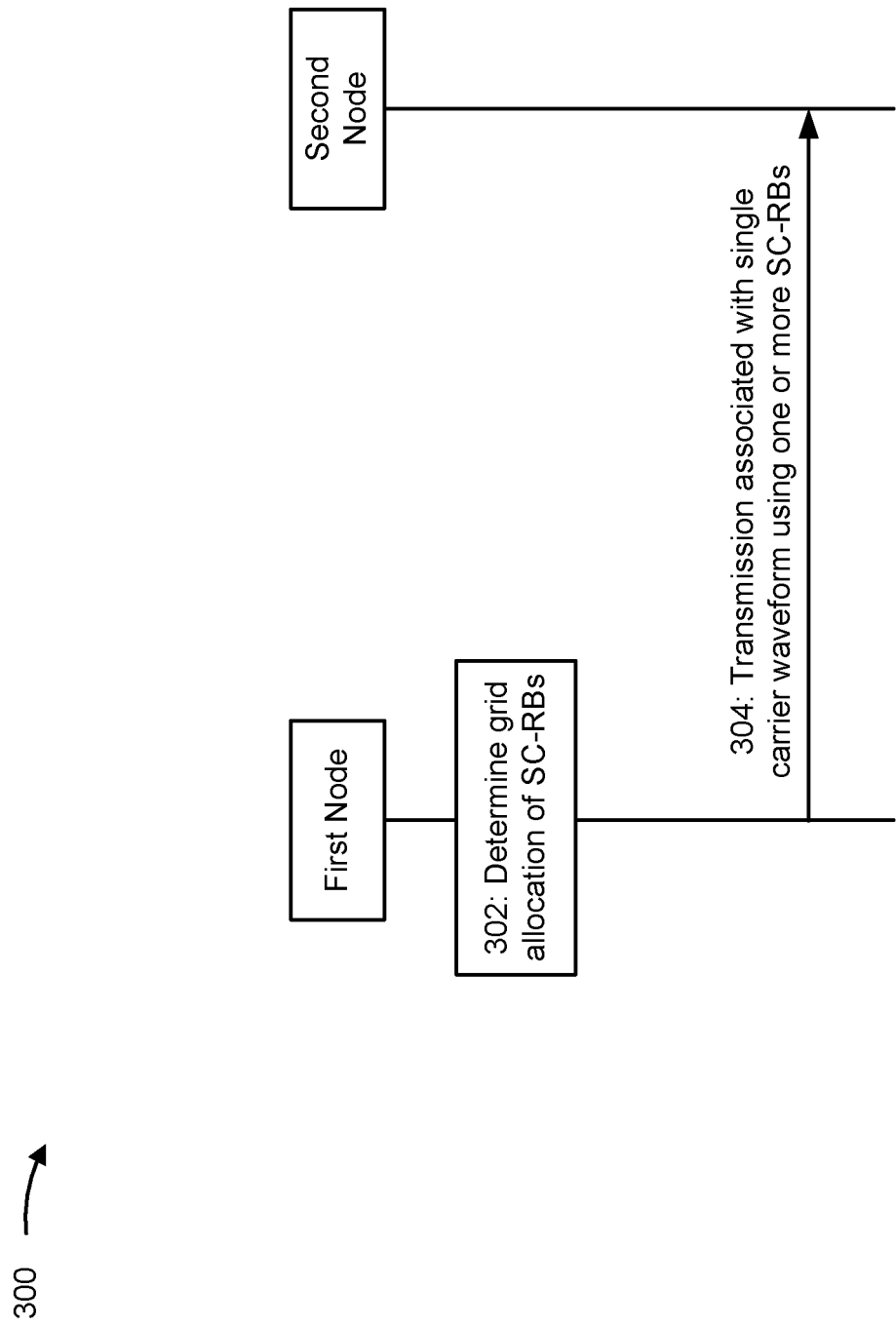
FIGS. 3-7 are diagrams illustrating examples associated with grid allocations for single carrier waveforms, in accordance with the present disclosure.

FIG. 3 is a diagram illustrating an example 300 of grid allocations for single carrier waveforms, in accordance with the present disclosure. As shown in FIG. 3, example 300 includes communication between a first node and a second node. In some aspects, the first node and the second node may be included in a wireless network such as wireless network 100.

In some aspects, the first node may be a UE (e.g., UE 120) and the second node may be a base station (e.g., base station 110). In some aspects, the first node may be a base station (e.g., base station 110) and the second node may be a UE (e.g., UE 120). In some aspects, the first node may be a first UE (e.g., UE 120a) and the second node may be a second UE (e.g., UE 120e). In some aspects, the first node may be a first base station (e.g., UE 110a) and the second node may be a second base station (e.g., base station 110d).

As shown by reference number 302, the first node may determine a grid allocation of SC-RBs. The grid allocation of SC-RBs may define a plurality of SC-RBs in a time domain and in a frequency domain. The grid allocation of SC-RBs may define one or more sub-bands in the frequency domain and one or more time periods in the time domain. A time period may be defined in terms of slots and/or symbols. The grid allocation of SC-RBs may be associated with a carrier or a channel that includes one or more sub-bands.

In some aspects, for single carrier waveforms, the grid allocation for the plurality of SC-RBs may be defined in the frequency domain by one or more frequency sub-bands and in the time domain by one or more time periods (e.g., slots and/or symbols). One or more SC-RBs indicated in the grid allocation of SC-RBs may be used to perform downlink and uplink transmissions. Further, a carrier or channel may be associated with one or more sub-bands.

In some examples, an initial SC-RBs configuration in the frequency domain, for example, for a system information block type 1 (SIB1), may be predefined or based at least in part on a single sideband bandwidth. In some aspects, a default SC-RBs configuration in the frequency domain may be configured. The default SC-RBs configuration may correspond to a full carrier bandwidth. The default SC-RBs configuration in the frequency domain may be the same or different from the initial SC-RBs configuration in the frequency domain.

In some aspects, the grid allocation of SC-RBs may be based at least in part on a dynamic configuration using downlink control information (DCI) or a medium access control control element (MAC-CE). In some aspects, the grid allocation of SC-RBs may be based at least in part on a semi-static configuration using radio resource control (RRC) signaling. In other words, the grid allocation of SC-RBs may be configured, activated, and/or deactivated dynamically or semi-statically based at least in part on DCI, MAC-CEs, and/or RRC signaling.

As shown by reference number 304, the first node may perform, to the second node, a frequency division multiplexed transmission associated with a single carrier waveform using one or more SC-RBs indicated in the grid allocation of SC-RBs. The frequency division multiplexed transmission may be an uplink transmission, a downlink transmission, or a sidelink transmission. In other words, the uplink transmission, the downlink transmission, or the sidelink transmission may be frequency division multiplexed and may be associated with a single carrier waveform.

In some aspects, the one or more SC-RBs associated with the frequency division multiplexed transmission may be aggregated SC-RBs. In some aspects, the aggregated SC-RBs may be contiguous in time. In some aspects, the aggregated SC-RBs may be non-contiguous in time. In some aspects, the aggregated SC-RBs may be contiguous in frequency. In some aspects, the aggregated SC-RBs may be non-contiguous in frequency. In other words, a downlink or uplink transmission may aggregate more than one SC-RB, and aggregated SC-RBs used for the downlink or uplink transmission may be contiguous or non-contiguous in time, and the aggregated SC-RBs used for the downlink or uplink transmission may be contiguous or non-contiguous in frequency.

In some examples, the grid allocation of SC-RBs may be associated with guard bands in the frequency domain between different allocations of aggregated SC-RBs. For example, guard bands may be defined in the frequency domain between different allocations of aggregated SC-RBs. The grid allocation of SC-RBs may not be associated with guard bands in the frequency domain between SC-RBs of a same allocation of aggregated SC-RBs. For example, guard bands may not be defined in the frequency domain between SC-RBs of the same allocation of aggregated SC-RBs.

In some aspects, the grid allocation of SC-RBs may be associated with switching time gaps in the time domain between different allocations of aggregated SC-RBs. The switching time gaps in the time domain may be based at least in part on a node capability (e.g., a UE capability). In other words, switching time gaps in the time domain may be defined between different allocations of aggregated SC-RBs. The switching time gaps in the time domain may be defined, for example, for when a bandwidth or frequency location of the aggregated SC-RBs change in time.

In some aspects, the first node may perform the frequency division multiplexed transmission using a panel, and multiple frequency division multiplexed transmissions may be performed using different panels. For example, the first node may perform a first frequency division multiplexed transmission based at least in part on a first panel, and the first node may perform a second frequency division multiplexed transmission based at least in part on a second panel. In some cases, multiple frequency division multiplexed uplink transmissions/channels may be needed to be performed, such as both a PUSCH transmission and a sounding reference signal (SRS) transmission. In this case, to reduce a PAPR impact, the first node may support multiple panels and the first node may transmit each channel/signal using a different panel.

In some aspects, the grid allocation of SC-RBs may be associated with an SC-RB hopping pattern. For example, SC-RBs in the grid allocation of SC-RBs that are used for frequency division multiplexed transmissions may hop in frequency to different SC-RBs based at least in part on the SC-RB hopping pattern. In some cases, to allow for frequency domain diversity and interference mitigation, SC-RB hopping may be configured by the SC-RB hopping pattern, such that SC-RBs used for downlink or uplink transmissions may hop in frequency to different SC-RBs in accordance with the SC-RB hopping pattern.

As indicated above, FIG. 3 is provided as an example. Other examples may differ from what is described with regard to FIG. 3.

Figure 4:
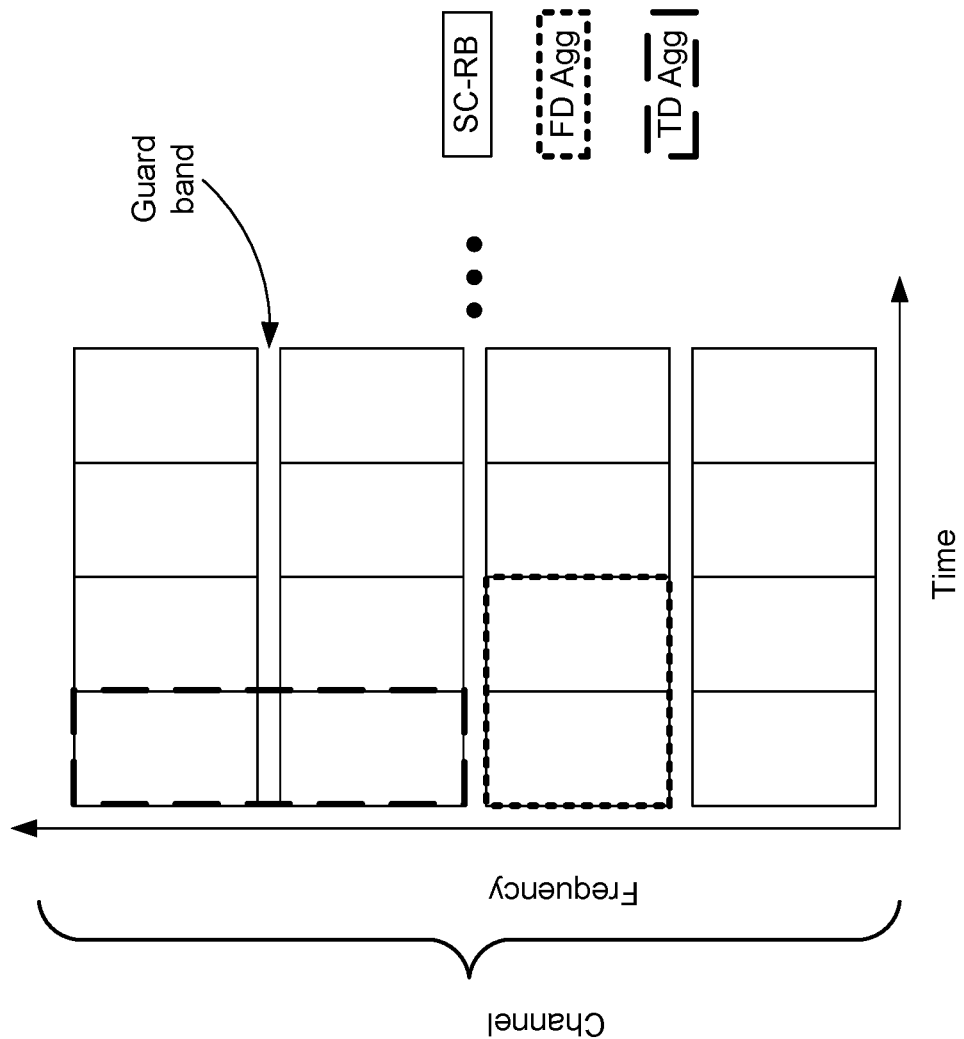

FIG. 4 is a diagram illustrating an example 400 of grid allocations for single carrier waveforms, in accordance with the present disclosure.

As shown in FIG. 4, a grid allocation of SC-RBs may indicate a plurality of SC-RBs in a time domain and in a frequency domain. A single SC-RB may be associated with a sub-band in the frequency domain and a time period (e.g., a quantity of slots and/or symbols) in the time domain. A carrier/channel may be associated with one or more sub-bands in the frequency domain. The grid allocation of SC-RBs may be associated with aggregated SC-RBs in the frequency domain (FD Agg) and/or aggregated SC-RBs in the time domain (TD Agg). Further, the grid allocation of SC-RBs may be associated with guard bands in the frequency domain. The guard bands may be defined between different allocations of aggregated SC-RBs.

As indicated above, FIG. 4 is provided as an example. Other examples may differ from what is described with regard to FIG. 4.

Figure 5:
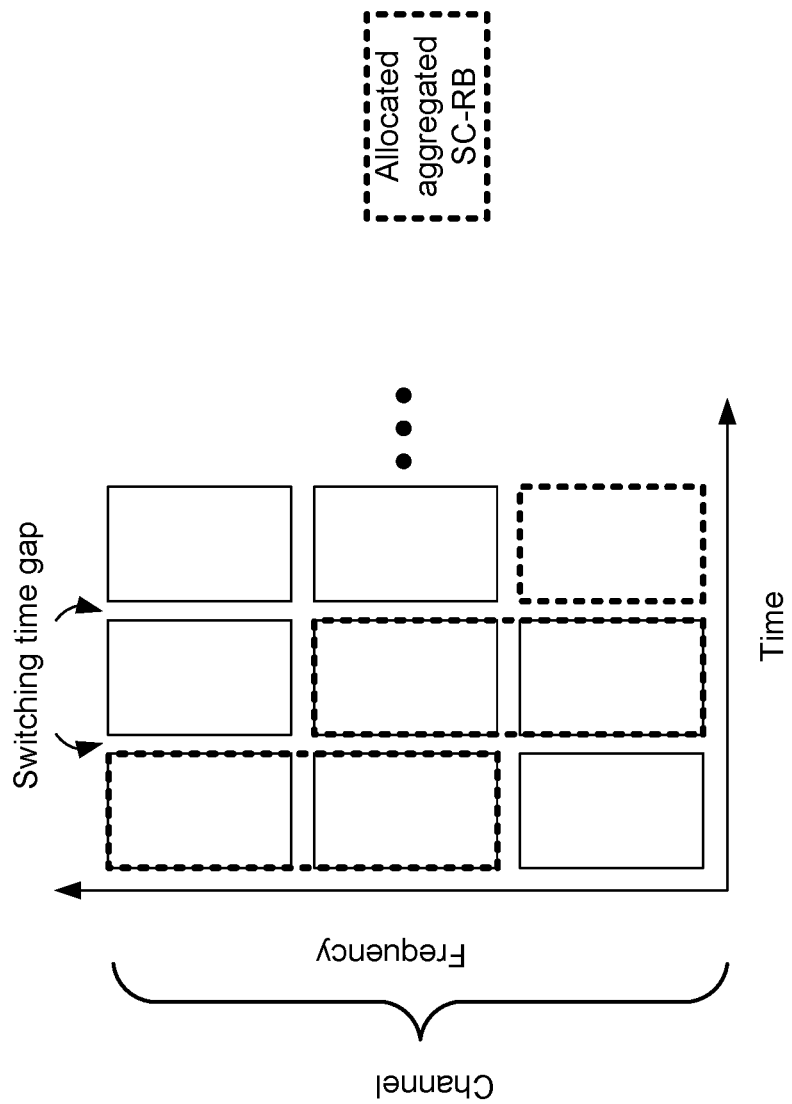

FIG. 5 is a diagram illustrating an example 500 of grid allocations for single carrier waveforms, in accordance with the present disclosure.

As shown in FIG. 5, a grid allocation of SC-RBs may indicate a plurality of SC-RBs in a time domain and in a frequency domain. The grid allocation of SC-RBs may be associated with switching time gaps in the time domain. The switching time gaps may be defined between different allocations of aggregated SC-RBs. For example, a switching time gap may be defined in the time domain between a first allocation of aggregated SC-RBs and a second allocation of aggregated SC-RBs. The switching time gaps may be based at least in part on a node capability (e.g., a UE capability).

As indicated above, FIG. 5 is provided as an example. Other examples may differ from what is described with regard to FIG. 5.

Figure 6:
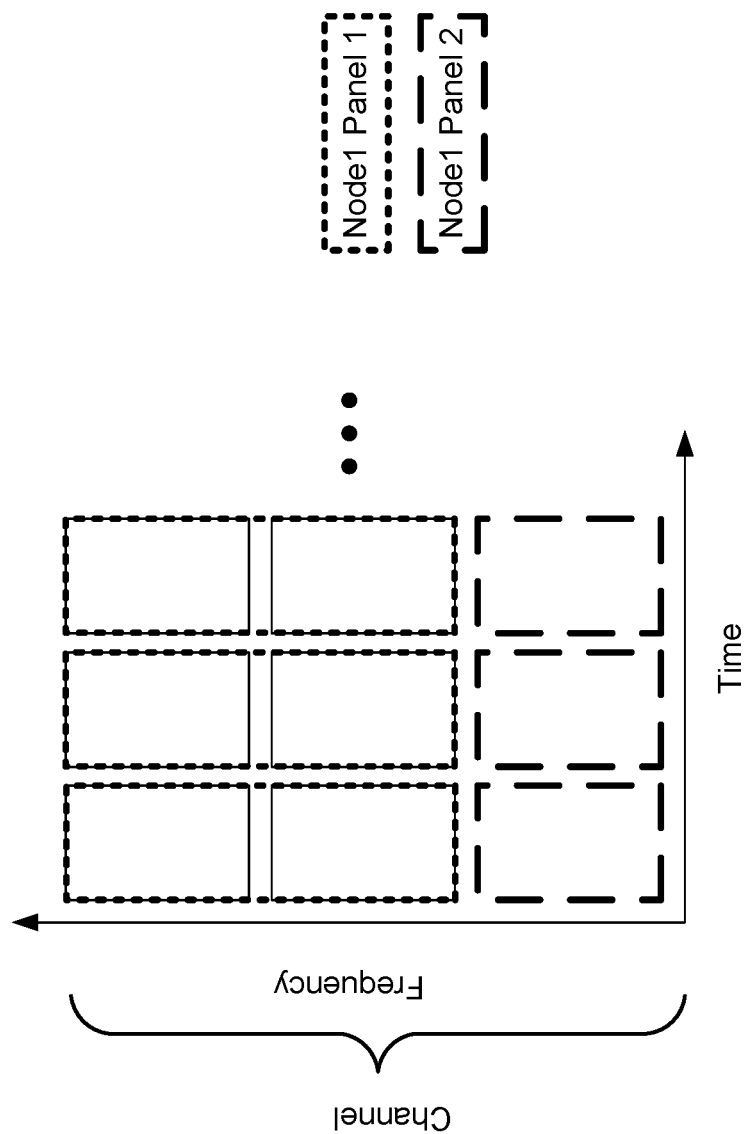

FIG. 6 is a diagram illustrating an example 600 of grid allocations for single carrier waveforms, in accordance with the present disclosure.

As shown in FIG. 6, a grid allocation of SC-RBs may indicate a plurality of SC-RBs in a time domain and in a frequency domain. The grid allocation of SC-RBs may be associated with different panels of SC-RBs. For example, the grid allocation of SC-RBs may be associated with a first panel for a node, and the grid allocation of SC-RBs may be associated with a second panel for the node. The first panel may be associated with a first allocation of aggregated SC-RBs, and the second panel may be associated with a second allocation of aggregated SC-RBs. In this example, the node may support multiple panels, and the node may transmit each channel/signal using a different panel, which may reduce a PAPR impact when multiple frequency division multiplexed uplink transmissions/channels are needed for the node.

As indicated above, FIG. 6 is provided as an example. Other examples may differ from what is described with regard to FIG. 6.

Figure 7:
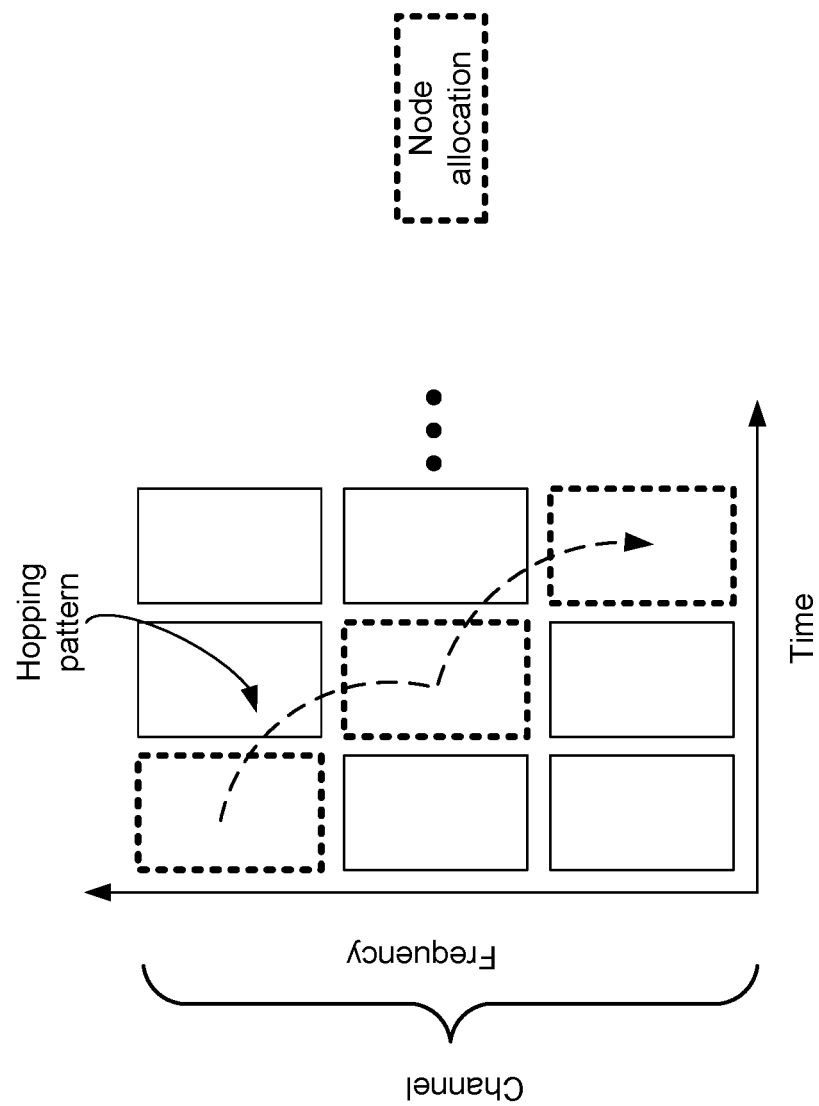

FIG. 7 is a diagram illustrating an example 700 of grid allocations for single carrier waveforms, in accordance with the present disclosure.

As shown in FIG. 7, a grid allocation of SC-RBs may indicate a plurality of SC-RBs in a time domain and in a frequency domain. The grid allocation of SC-RBs may be associated with an SC-RB hopping pattern. The SC-RB hopping pattern may define an allocation of different SC-RBs for a same node. The allocation of different SC-RBs may be across different SC-RBs in the time domain and in the frequency domain. SC-RBs associated with the SC-RB hopping pattern may be used for downlink and uplink transmissions. SC-RB hopping may allow for frequency domain diversity and interference mitigation.

As indicated above, FIG. 7 is provided as an example. Other examples may differ from what is described with regard to FIG. 7.

Figure 8:
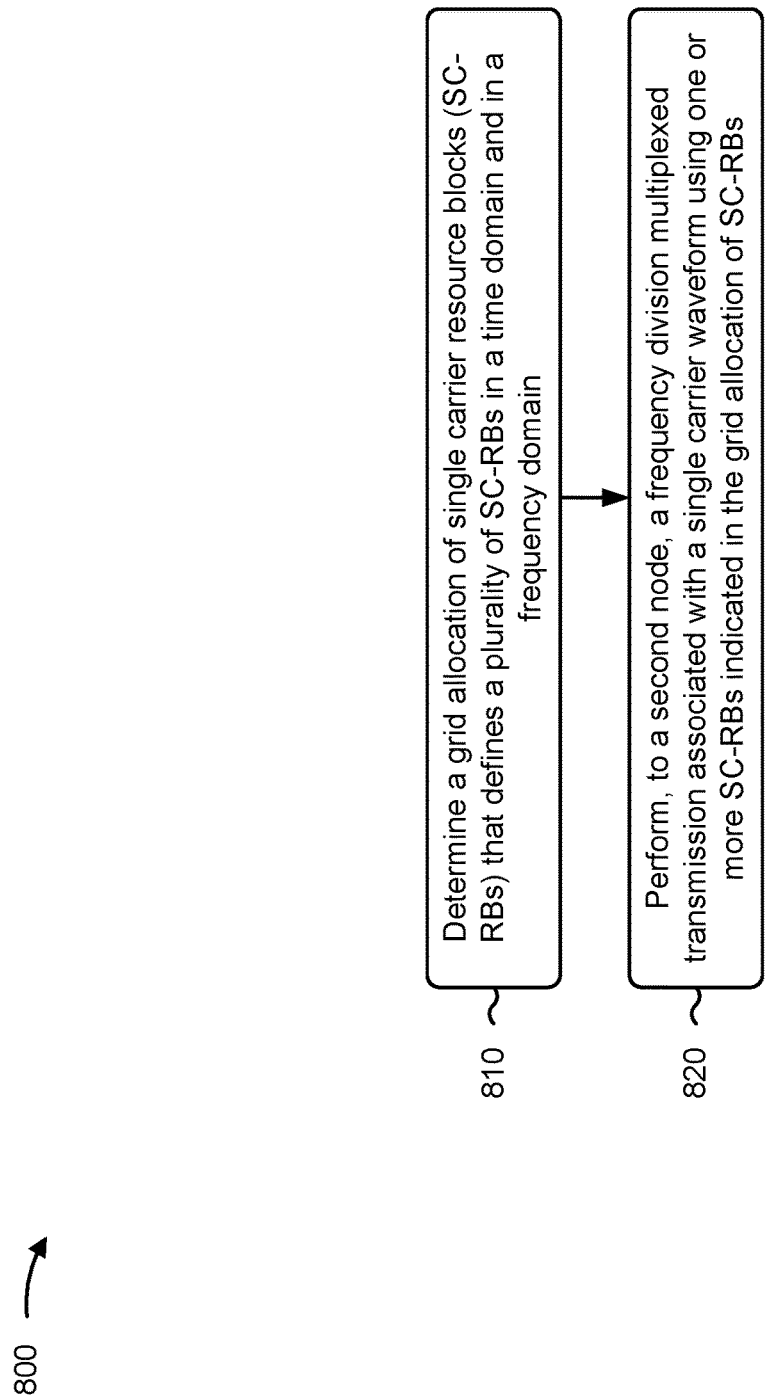
FIGS. 8-9 are diagrams illustrating example processes associated with grid allocations for single carrier waveforms, in accordance with the present disclosure.

FIG. 8 is a diagram illustrating an example process 800 performed, for example, by a first node, in accordance with the present disclosure. Example process 800 is an example where the first node performs operations associated with grid allocation for single carrier waveforms.

As shown in FIG. 8, in some aspects, process 800 may include determining a grid allocation of SC-RBs that defines a plurality of SC-RBs in a time domain and in a frequency domain (block 810). For example, the first node (e.g., using determination component 1008, depicted in FIG. 10) may determine a grid allocation of SC-RBs that defines a plurality of SC-RBs in a time domain and in a frequency domain, as described above.

As further shown in FIG. 8, in some aspects, process 800 may include performing, to a second node, a frequency division multiplexed transmission associated with a single carrier waveform using one or more SC-RBs indicated in the grid allocation of SC-RBs (block 820). For example, the first node (e.g., using transmission component 1004, depicted in FIG. 10) may perform, to a second node, a frequency division multiplexed transmission associated with a single carrier waveform using one or more SC-RBs indicated in the grid allocation of SC-RBs, as described above.

Process 800 may include additional aspects, such as any single aspect or any combination of aspects described below and/or in connection with one or more other processes described elsewhere herein.

In a first aspect, the frequency division multiplexed transmission is an uplink transmission, a downlink transmission, or a sidelink transmission.

In a second aspect, alone or in combination with the first aspect, the grid allocation of SC-RBs is associated with one or more sub-bands in the frequency domain and one or more time periods in the time domain, wherein a time period in the one or more time periods is a slot or a symbol.

In a third aspect, alone or in combination with one or more of the first and second aspects, the grid allocation of SC-RBs is associated with a carrier or a channel that includes one or more sub-bands.

In a fourth aspect, alone or in combination with one or more of the first through third aspects, the one or more SC-RBs associated with the frequency division multiplexed transmission are aggregated SC-RBs, and wherein the aggregated SC-RBs are one or more of: contiguous in time, non-contiguous in time, contiguous in frequency, or non-contiguous in frequency.

In a fifth aspect, alone or in combination with one or more of the first through fourth aspects, the grid allocation of SC-RBs is associated with guard bands in the frequency domain between different allocations of aggregated SC-RBs.

In a sixth aspect, alone or in combination with one or more of the first through fifth aspects, the grid allocation of SC-RBs is not associated with guard bands in the frequency domain between SC-RBs of a same allocation of aggregated SC-RBs.

In a seventh aspect, alone or in combination with one or more of the first through sixth aspects, the grid allocation of SC-RBs is associated with switching time gaps in the time domain between different allocations of aggregated SC-RBs, and wherein the switching time gaps in the time domain are based at least in part on a node capability.

In an eighth aspect, alone or in combination with one or more of the first through seventh aspects, the frequency division multiplexed transmission is a first frequency division multiplexed transmission associated with a first panel, and wherein a second frequency division multiplexed transmission is associated with a second panel.

In a ninth aspect, alone or in combination with one or more of the first through eighth aspects, the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

In a tenth aspect, alone or in combination with one or more of the first through ninth aspects, an initial SC-RB configuration is predefined or based at least in part on a single sideband bandwidth.

In an eleventh aspect, alone or in combination with one or more of the first through tenth aspects, process 800 includes the grid allocation of SC-RBs is based at least in part on a dynamic configuration using downlink control information or a MAC-CE, or the grid allocation of SC-RBs is based at least in part on a semi-static configuration using radio resource control signaling.

In a twelfth aspect, alone or in combination with one or more of the first through eleventh aspects, process 800 includes the first node is a base station or a UE, and the second node is a base station or a UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
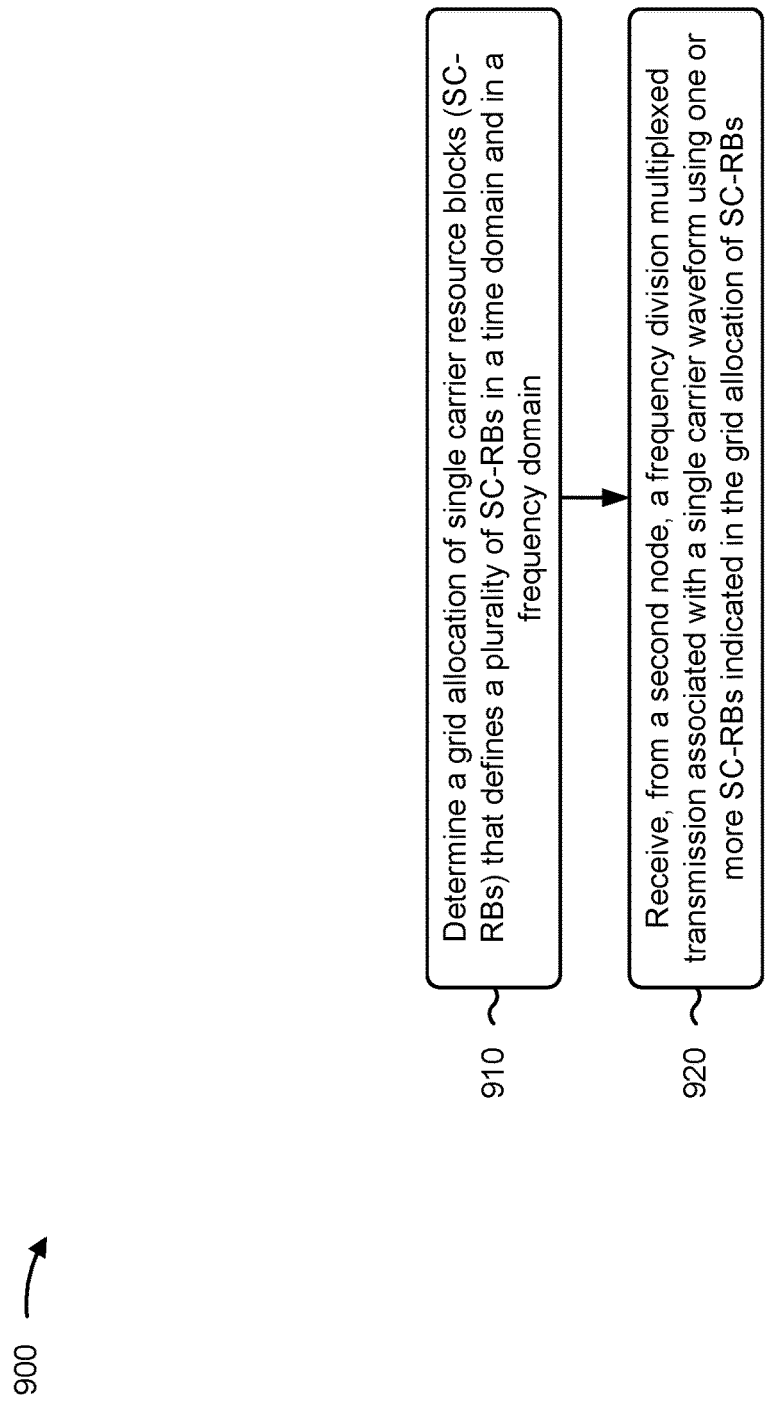

FIG. 9 is a diagram illustrating an example process 900 performed, for example, by a first node, in accordance with the present disclosure. Example process 900 is an example where the first node performs operations associated with grid allocation for single carrier waveforms.

As shown in FIG. 9, in some aspects, process 900 may include determining a grid allocation of SC-RBs that defines a plurality of SC-RBs in a time domain and in a frequency domain (block 910). For example, the first node (e.g., using determination component 1008, depicted in FIG. 10) may determine a grid allocation of SC-RBs that defines a plurality of SC-RBs in a time domain and in a frequency domain, as described above.

As further shown in FIG. 9, in some aspects, process 900 may include receiving, from a second node, a frequency division multiplexed transmission associated with a single carrier waveform using one or more SC-RBs indicated in the grid allocation of SC-RBs (block 920). For example, the first node (e.g., using reception component 1002, depicted in FIG. 10) may receive, from a second node, a frequency division multiplexed transmission associated with a single carrier waveform using one or more SC-RBs indicated in the grid allocation of SC-RBs, as described above.

Process 900 may include additional aspects, such as any single aspect or any combination of aspects described below and/or in connection with one or more other processes described elsewhere herein.

In a first aspect, the frequency division multiplexed transmission is an uplink transmission, a downlink transmission, or a sidelink transmission.

In a second aspect, alone or in combination with the first aspect, the grid allocation of SC-RBs is associated with one or more sub-bands in the frequency domain and one or more time periods in the time domain, wherein a time period in the one or more time periods is a slot or a symbol.

In a third aspect, alone or in combination with one or more of the first and second aspects, the grid allocation of SC-RBs is associated with a carrier or a channel that includes one or more sub-bands.

In a fourth aspect, alone or in combination with one or more of the first through third aspects, the one or more SC-RBs associated with the frequency division multiplexed transmission are aggregated SC-RBs, and wherein the aggregated SC-RBs are one or more of: contiguous in time, non-contiguous in time, contiguous in frequency, or non-contiguous in frequency.

In a fifth aspect, alone or in combination with one or more of the first through fourth aspects, the grid allocation of SC-RBs is associated with guard bands in the frequency domain between different allocations of aggregated SC-RBs.

In a sixth aspect, alone or in combination with one or more of the first through fifth aspects, the grid allocation of SC-RBs is not associated with guard bands in the frequency domain between SC-RBs of a same allocation of aggregated SC-RBs.

In a seventh aspect, alone or in combination with one or more of the first through sixth aspects, the grid allocation of SC-RBs is associated with switching time gaps in the time domain between different allocations of aggregated SC-RBs, and wherein the switching time gaps in the time domain are based at least in part on a node capability.

In an eighth aspect, alone or in combination with one or more of the first through seventh aspects, the frequency division multiplexed transmission is a first frequency division multiplexed transmission associated with a first panel, and wherein a second frequency division multiplexed transmission is associated with a second panel.

In a ninth aspect, alone or in combination with one or more of the first through eighth aspects, the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

In a tenth aspect, alone or in combination with one or more of the first through ninth aspects, process 900 includes the grid allocation of SC-RBs is based at least in part on a dynamic configuration using downlink control information or a MAC-CE, or the grid allocation of SC-RBs is based at least in part on a semi-static configuration using radio resource control signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
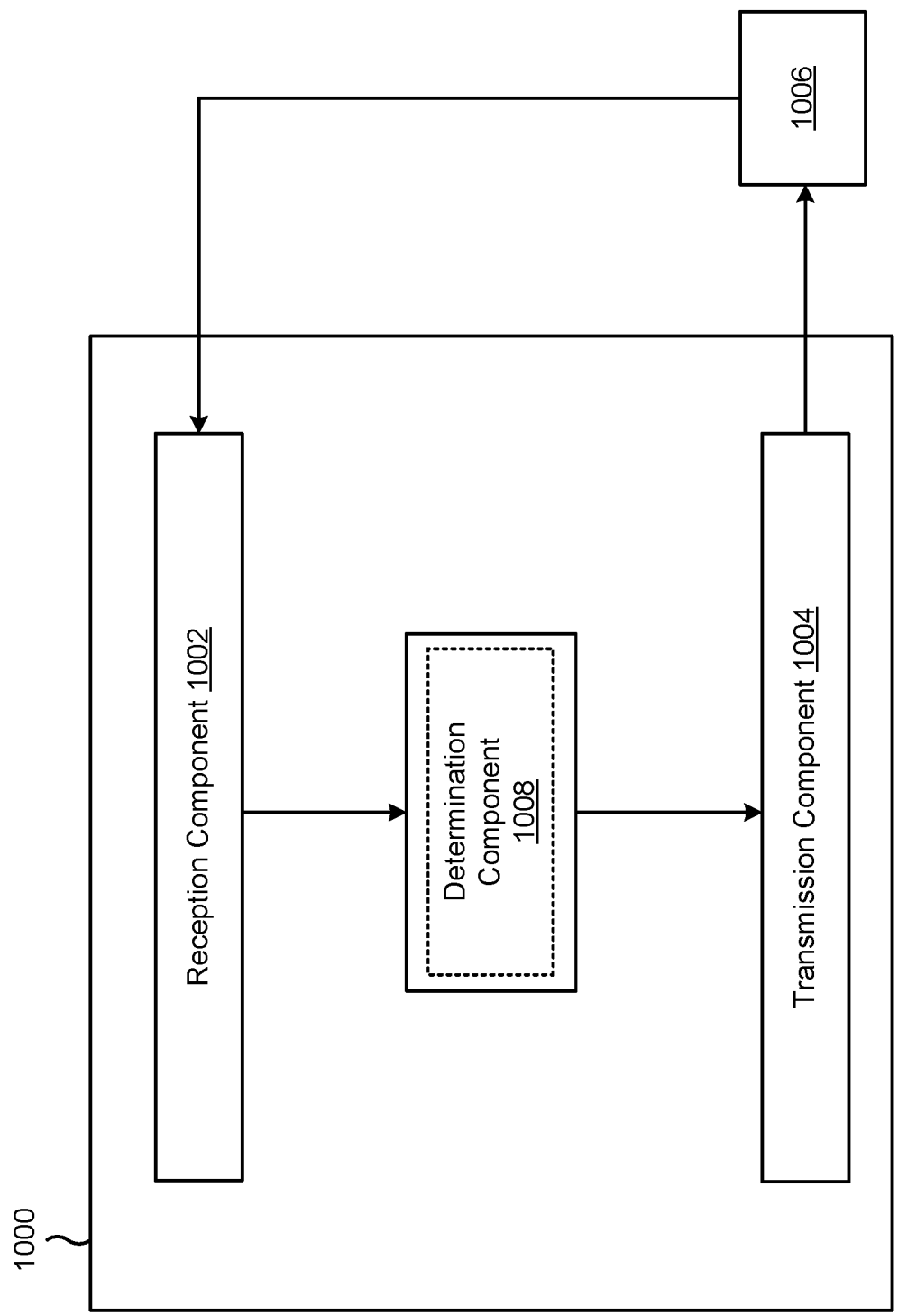
FIG. 10 is a block diagram of an example apparatus for wireless communication, in accordance with the present disclosure.

FIG. 10 is a block diagram of an example apparatus 1000 for wireless communication. The apparatus 1000 may be a first node, or a first node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the first node described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the first node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the first node described above in connection with FIG. 2. In some aspects, the transmission component 1004 may be co-located with the reception component 1002 in a transceiver.

The determination component 1008 may determine a grid allocation of SC-RBs that defines a plurality of SC-RBs in a time domain and in a frequency domain. The transmission component 1004 may perform, to a second node, a frequency division multiplexed transmission associated with a single carrier waveform using one or more SC-RBs indicated in the grid allocation of SC-RBs.

The determination component 1008 may determine a grid allocation of SC-RBs that defines a plurality of SC-RBs in a time domain and in a frequency domain. The reception component 1002 may receive, from a second node, a frequency division multiplexed transmission associated with a single carrier waveform using one or more SC-RBs indicated in the grid allocation of SC-RBs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first node, comprising: determining a grid allocation of single carrier resource blocks (SC-RBs) that defines a plurality of SC-RBs in a time domain and in a frequency domain; and performing, to a second node, a frequency division multiplexed transmission associated with a single carrier waveform using one or more SC-RBs indicated in the grid allocation of SC-RBs.

Aspect 2: The method of Aspect 1, wherein the frequency division multiplexed transmission is an uplink transmission, a downlink transmission, or a sidelink transmission.

Aspect 3: The method of any of Aspects 1 through 2, wherein the grid allocation of SC-RBs is associated with one or more sub-bands in the frequency domain and one or more time periods in the time domain, wherein a time period in the one or more time periods is a slot or a symbol.

Aspect 4: The method of any of Aspects 1 through 3, wherein the grid allocation of SC-RBs is associated with a carrier or a channel that includes one or more sub-bands.

Aspect 5: The method of any of Aspects 1 through 4, wherein the one or more SC-RBs associated with the frequency division multiplexed transmission are aggregated SC-RBs, and wherein the aggregated SC-RBs are one or more of: contiguous in time; non-contiguous in time; contiguous in frequency; or non-contiguous in frequency.

Aspect 6: The method of any of Aspects 1 through 5, wherein the grid allocation of SC-RBs is associated with guard bands in the frequency domain between different allocations of aggregated SC-RBs.

Aspect 7: The method of any of Aspects 1 through 6, wherein the grid allocation of SC-RBs is not associated with guard bands in the frequency domain between SC-RBs of a same allocation of aggregated SC-RBs.

Aspect 8: The method of any of Aspects 1 through 7, wherein the grid allocation of SC-RBs is associated with switching time gaps in the time domain between different allocations of aggregated SC-RBs, and wherein the switching time gaps in the time domain are based at least in part on a node capability.

Aspect 9: The method of any of Aspects 1 through 8, wherein the frequency division multiplexed transmission is a first frequency division multiplexed transmission associated with a first panel, and wherein a second frequency division multiplexed transmission is associated with a second panel.

Aspect 10: The method of any of Aspects 1 through 9, wherein the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

Aspect 11: The method of any of Aspects 1 through 10, wherein an initial SC-RB configuration is predefined or based at least in part on a single sideband bandwidth.

Aspect 12: The method of any of Aspects 1 through 11, wherein: the grid allocation of SC-RBs is based at least in part on a dynamic configuration using downlink control information or a medium access control control element; or the grid allocation of SC-RBs is based at least in part on a semi-static configuration using radio resource control signaling.

Aspect 13: The method of any of Aspects 1 through 12, wherein: the first node is a base station or a user equipment (UE); and the second node is a base station or a UE.

Aspect 14: A method of wireless communication performed by a first node, comprising: determining a grid allocation of single carrier resource blocks (SC-RBs) that defines a plurality of SC-RBs in a time domain and in a frequency domain; and receiving, from a second node, a frequency division multiplexed transmission associated with a single carrier waveform using one or more SC-RBs indicated in the grid allocation of SC-RBs.

Aspect 15: The method of Aspect 14, wherein the frequency division multiplexed transmission is an uplink transmission, a downlink transmission, or a sidelink transmission.

Aspect 16: The method of any of Aspects 14 through 15, wherein the grid allocation of SC-RBs is associated with one or more sub-bands in the frequency domain and one or more time periods in the time domain, wherein a time period in the one or more time periods is a slot or a symbol.

Aspect 17: The method of any of Aspects 14 through 16, wherein the grid allocation of SC-RBs is associated with a carrier or a channel that includes one or more sub-bands.

Aspect 18: The method of any of Aspects 14 through 17, wherein the one or more SC-RBs associated with the frequency division multiplexed transmission are aggregated SC-RBs, and wherein the aggregated SC-RBs are one or more of: contiguous in time; non-contiguous in time; contiguous in frequency; or non-contiguous in frequency.

Aspect 19: The method of any of Aspects 14 through 18, wherein the grid allocation of SC-RBs is associated with guard bands in the frequency domain between different allocations of aggregated SC-RBs.

Aspect 20: The method of any of Aspects 14 through 19, wherein the grid allocation of SC-RBs is not associated with guard bands in the frequency domain between SC-RBs of a same allocation of aggregated SC-RBs.

Aspect 21: The method of any of Aspects 14 through 20, wherein the grid allocation of SC-RBs is associated with switching time gaps in the time domain between different allocations of aggregated SC-RBs, and wherein the switching time gaps in the time domain are based at least in part on a node capability.

Aspect 22: The method of any of Aspects 14 through 21, wherein the frequency division multiplexed transmission is a first frequency division multiplexed transmission associated with a first panel, and wherein a second frequency division multiplexed transmission is associated with a second panel.

Aspect 23: The method of any of Aspects 14 through 22, wherein the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

Aspect 24: The method of any of Aspects 14 through 23, wherein: the grid allocation of SC-RBs is based at least in part on a dynamic configuration using downlink control information or a medium access control control element; or the grid allocation of SC-RBs is based at least in part on a semi-static configuration using radio resource control signaling.

Aspect 25: An apparatus for wireless communication at a device, comprising a processor; memory coupled with the processor; and instructions stored in the memory and executable by the processor to cause the apparatus to perform the method of one or more Aspects of Aspects 1-13.

Aspect 26: A device for wireless communication, comprising a memory and one or more processors coupled to the memory, the memory and the one or more processors configured to perform the method of one or more Aspects of Aspects 1-13.

Aspect 27: An apparatus for wireless communication, comprising at least one means for performing the method of one or more Aspects of Aspects 1-13.

Aspect 28: A non-transitory computer-readable medium storing code for wireless communication, the code comprising instructions executable by a processor to perform the method of one or more Aspects of Aspects 1-13.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 30: An apparatus for wireless communication at a device, comprising a processor; memory coupled with the processor; and instructions stored in the memory and executable by the processor to cause the apparatus to perform the method of one or more Aspects of Aspects 14-24.

Aspect 31: A device for wireless communication, comprising a memory and one or more processors coupled to the memory, the memory and the one or more processors configured to perform the method of one or more Aspects of Aspects 14-24.

Aspect 32: An apparatus for wireless communication, comprising at least one means for performing the method of one or more Aspects of Aspects 14-24.

Aspect 33: A non-transitory computer-readable medium storing code for wireless communication, the code comprising instructions executable by a processor to perform the method of one or more Aspects of Aspects 14-24.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 14-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first node, comprising:
    determining a grid allocation of single carrier resource blocks (SC-RBs) that defines a plurality of SC-RBs in a time domain and in a frequency domain, the grid allocation of SC-RBs being associated with switching time gaps in the time domain between different allocations of the plurality of SC-RBs, the switching time gaps in the time domain being based at least in part on a node capability; and
    performing, to a second node, a frequency division multiplexed transmission associated with a single carrier waveform using one or more SC-RBs indicated in the grid allocation of SC-RBs.

2. The method of claim 1, wherein the frequency division multiplexed transmission is an uplink transmission, a downlink transmission, or a sidelink transmission.

3. The method of claim 1, wherein the grid allocation of SC-RBs is associated with one or more sub-bands in the frequency domain and one or more time periods in the time domain, wherein a time period in the one or more time periods is a slot or a symbol.

4. The method of claim 1, wherein the grid allocation of SC-RBs is associated with a carrier or a channel that includes one or more sub-bands.

5. The method of claim 1, wherein the one or more SC-RBs associated with the frequency division multiplexed transmission are aggregated SC-RBs, and wherein the aggregated SC-RBs are one or more of:
    contiguous in time;
    non-contiguous in time;
    contiguous in frequency; or
    non-contiguous in frequency.

6. The method of claim 1, wherein the grid allocation of SC-RBs is associated with guard bands in the frequency domain between different allocations of aggregated SC-RBs.

7. The method of claim 1, wherein the grid allocation of SC-RBs is not associated with guard bands in the frequency domain between SC-RBs of a same allocation of aggregated SC-RBs.

8. The method of claim 1, wherein the frequency division multiplexed transmission is a first frequency division multiplexed transmission associated with a first panel, and wherein a second frequency division multiplexed transmission is associated with a second panel.

9. The method of claim 1, wherein the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

10. The method of claim 1, wherein an initial SC-RB configuration is predefined or based at least in part on a single sideband bandwidth.

11. The method of claim 1, wherein:
    the grid allocation of SC-RBs is based at least in part on a dynamic configuration using downlink control information or a medium access control (MAC) control element (MAC-CE); or the grid allocation of SC-RBs is based at least in part on a semi-static configuration using radio resource control signaling.

12. The method of claim 1, wherein:
the first node is a base station or a user equipment (UE); and
the second node is a base station or a UE.

13. A method of wireless communication performed by a first node, comprising:
determining a grid allocation of single carrier resource blocks (SC-RBs) that defines a plurality of SC-RBs in a time domain and in a frequency domain, the grid allocation of SC-RBs being associated with switching time gaps in the time domain between different allocations of the plurality of SC-RBs, the switching time gaps in the time domain being based at least in part on a node capability; and
receiving, from a second node, a frequency division multiplexed transmission associated with a single carrier waveform using one or more SC-RBs indicated in the grid allocation of SC-RBs.

14. The method of claim 13, wherein the frequency division multiplexed transmission is an uplink transmission, a downlink transmission, or a sidelink transmission.

15. The method of claim 13, wherein the grid allocation of SC-RBs is associated with one or more sub-bands in the frequency domain and one or more time periods in the time domain, wherein a time period in the one or more time periods is a slot or a symbol.

16. The method of claim 13, wherein the grid allocation of SC-RBs is associated with a carrier or a channel that includes one or more sub-bands.

17. The method of claim 13, wherein the one or more SC-RBs associated with the frequency division multiplexed transmission are aggregated SC-RBs, and wherein the aggregated SC-RBs are one or more of:
contiguous in time;
non-contiguous in time;
contiguous in frequency; or
non-contiguous in frequency.

18. The method of claim 13, wherein the grid allocation of SC-RBs is associated with guard bands in the frequency domain between different allocations of aggregated SC-RBs.

19. The method of claim 13, wherein the grid allocation of SC-RBs is not associated with guard bands in the frequency domain between SC-RBs of a same allocation of aggregated SC-RBs.

20. The method of claim 13, wherein the frequency division multiplexed transmission is a first frequency division multiplexed transmission associated with a first panel, and wherein a second frequency division multiplexed transmission is associated with a second panel.

21. The method of claim 13, wherein the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern.

22. The method of claim 13, wherein:
the grid allocation of SC-RBs is based at least in part on a dynamic configuration using downlink control information or a medium access control (MAC) control element (MAC-CE); or
the grid allocation of SC-RBs is based at least in part on a semi-static configuration using radio resource control signaling.

23. A first node for wireless communication, comprising:
a memory; and
one or more processors, coupled to the memory, configured to cause the first node to:
determine a grid allocation of single carrier resource blocks (SC-RBs) that defines a plurality of SC-RBs in a time domain and in a frequency domain, the grid allocation of SC-RBs being associated with switching time gaps in the time domain between different allocations of the plurality of SC-RBs, the switching time gaps in the time domain being based at least in part on a node capability; and
perform, to a second node, a frequency division multiplexed transmission associated with a single carrier waveform using one or more SC-RBs indicated in the grid allocation of SC-RBs.

24. The first node of claim 23, wherein:
the frequency division multiplexed transmission is an uplink transmission, a downlink transmission, or a sidelink transmission;
the grid allocation of SC-RBs is associated with one or more sub-bands in the frequency domain and one or more time periods in the time domain, wherein a time period in the one or more time periods is a slot or a symbol; or
the grid allocation of SC-RBs is associated with a carrier or a channel that includes one or more sub-bands.

25. The first node of claim 23, wherein the one or more SC-RBs associated with the frequency division multiplexed transmission are aggregated SC-RBs, and wherein the aggregated SC-RBs are one or more of:
contiguous in time;
non-contiguous in time;
contiguous in frequency; or
non-contiguous in frequency.

26. The first node of claim 23, wherein the grid allocation of SC-RBs is associated with guard bands in the frequency domain between different allocations of aggregated SC-RBs.

27. The first node of claim 23, wherein the grid allocation of SC-RBs is not associated with guard bands in the frequency domain between SC-RBs of a same allocation of aggregated SC-RBs.

28. A first node for wireless communication, comprising:
a memory; and
one or more processors, coupled to the memory, configured to cause the first node to:
determine a grid allocation of single carrier resource blocks (SC-RBs) that defines a plurality of SC-RBs in a time domain and in a frequency domain, the grid allocation of SC-RBs being associated with switching time gaps in the time domain between different allocations of the plurality of SC-RBs, the switching time gaps in the time domain being based at least in part on a node capability; and
receive, from a second node, a frequency division multiplexed transmission associated with a single carrier waveform using one or more SC-RBs indicated in the grid allocation of SC-RBs.

29. The first node of claim 28, wherein:
the grid allocation of SC-RBs is associated with guard bands in the frequency domain between different allocations of aggregated SC-RBs;
the grid allocation of SC-RBs is not associated with guard bands in the frequency domain between SC-RBs of a same allocation of aggregated SC-RBs;
the frequency division multiplexed transmission is a first frequency division multiplexed transmission associated with a first panel, and wherein a second frequency division multiplexed transmission is associated with a second panel.

30. The first node of claim 28, wherein:

the grid allocation of SC-RBs is associated with an SC-RB hopping pattern, wherein SC-RBs in the grid allocation of SC-RBs that are used for frequency division multiplexed transmissions hop in frequency to different SC-RBs based at least in part on the SC-RB hopping pattern;

the grid allocation of SC-RBs is based at least in part on a dynamic configuration using downlink control information or a medium access control (MAC) control element (MAC-CE); or the grid allocation of SC-RBs is based at least in part on a semi-static configuration using radio resource control signaling.

* * * * *